US011983026B2

(12) United States Patent
Eberlein

(10) Patent No.: US 11,983,026 B2
(45) Date of Patent: May 14, 2024

(54) LOW OUTPUT IMPEDANCE VOLTAGE REFERENCE CIRCUIT

(71) Applicant: Apple Inc., Cupertino, CA (US)

(72) Inventor: Matthias Eberlein, Holzkirchen (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/655,152

(22) Filed: Mar. 16, 2022

(65) Prior Publication Data

US 2023/0297127 A1 Sep. 21, 2023

(51) Int. Cl.
*G05F 3/30* (2006.01)
*G05F 1/56* (2006.01)

(52) U.S. Cl.
CPC . *G05F 1/56* (2013.01); *G05F 3/30* (2013.01)

(58) Field of Classification Search
None
See application file for complete search history.

(56) References Cited

U.S. PATENT DOCUMENTS 4,263,519 A * 4/1981 Schade, Jr. ............... G05F 3/30 330/261
4,622,512 A * 11/1986 Brokaw .................... G05F 3/30 323/907
6,885,179 B1 * 4/2005 Ker ........................... G05F 3/30 323/316
7,193,454 B1 * 3/2007 Marinca .................... G05F 3/30 327/539
7,274,250 B2 * 9/2007 Hazucha ................... G05F 3/30 327/539
7,489,184 B2 * 2/2009 Pan ........................... G05F 3/30 327/512
7,626,374 B2 * 12/2009 Haiplik ..................... G05F 3/30 327/539
7,642,840 B2 * 1/2010 Kurata ...................... G05F 3/30 327/538
9,921,592 B2 * 3/2018 Shor ......................... G05F 1/59
2006/0001413 A1 1/2006 Marinca
2007/0296392 A1 * 12/2007 Chen ......................... G05F 3/30 323/313
2008/0088361 A1 * 4/2008 Kimura ..................... G05F 3/30 327/541
2008/0224682 A1 * 9/2008 Haiplik ..................... G05F 3/30 327/539

(Continued)

OTHER PUBLICATIONS

Hironori Banba, et al., “A CMOS Bandgap Reference Circuit with Sub-1-V Operation,” IEEE Journal of Solid- State Circuits, vol. 34, No. May 5, 1999, pp. 670-674.

*Primary Examiner* — Thomas J. Hiltunen
(74) *Attorney, Agent, or Firm* — Kowert, Hood, Munyon, Rankin & Goetzel, P.C.; Dean M. Munyon

(57) ABSTRACT

A voltage reference circuit included in a computer system includes two bipolar devices with two different current densities which are used to generate two base-emitter voltages, which are scaled using divider circuits. The voltage reference circuit also includes a feedback circuit that generates a reference voltage using the scaled base-emitter voltages and a feedback signal. The feedback signal is generated using the reference signal and combined with one of the scaled base-emitter voltages to compensate for variations in load current from the reference circuit.

20 Claims, 9 Drawing Sheets

(56) References Cited

U.S. PATENT DOCUMENTS

| | | | | |
|---|---|---|---|---|
| 2008/0284501 | A1* | 11/2008 | Kim | G05F 3/205<br>327/538 |
| 2014/0247034 | A1* | 9/2014 | Lok | G05F 3/02<br>323/313 |
| 2019/0025868 | A1 | 1/2019 | Segarra | |
| 2019/0123729 | A1* | 4/2019 | Minami | G05F 3/267 |
| 2020/0183440 | A1 | 6/2020 | Rasmus | |

* cited by examiner

LOW OUTPUT IMPEDANCE VOLTAGE REFERENCE CIRCUIT

BACKGROUND

Technical Field

This disclosure relates to analog circuits in computer systems and, more particularly, to voltage reference circuits.

Description of the Related Art

Modern computer systems include many circuits that need to maintain their operation regardless of variations in the manufacturing process, power supply voltage level, and temperature. Such circuits can include analog-to-digital converter circuits, digital-to-analog converter circuits, radio-frequency (RF) circuits, high-speed input/output (I/O) circuits, and the like.

To maintain stable operation across variations in process, voltage, and temperature (PVT), circuits rely on stable voltages and currents that exhibit little dependence on power supply voltage and process parameters, and a well-defined dependence on temperature. For example, the voltage gain and noise of a differential amplifier circuit is dependent on a current used to bias a differential pair included in the differential amplifier circuit.

One technique to generate a voltage or current that varies little with process variation and changes in power supply voltage is to base the voltage or current on a physical property of silicon. A commonly used property of silicon used in many reference circuits is the band or energy gap of silicon. The band gap refers to an energy range in silicon where no electronic states can exist. Using the band gap allows the generation of currents and voltages that vary little with variations in process and power supply voltage.

To create a current or voltage with the desired temperature behavior, different currents and voltages with different temperature variations can be combined. For example, a current whose value is proportional-to-absolute-temperature (PTAT) can be combined with a current whose value is complementary-to-absolute-temperature (CTAT) to generate a current that varies little with temperature. By employing the silicon band gap to generate a PTAT current along with a CTAT current, a reference circuit can generate a voltage or current with the desired behavior.

SUMMARY OF THE EMBODIMENTS

Various embodiments for generating a reference voltage are disclosed. Broadly speaking, a voltage reference circuit includes a current source, a first bipolar device, a second bipolar device, a first divider circuit, a second divider circuit, and a feedback circuit. The current source is configured to generate first and second bias currents. The first bipolar device is configured to generate a first base-emitter voltage using the first bias current, and the second bipolar device is configured to generate a second base-emitter voltage using the second bias current. A current density of the first bipolar device is different than a current density of the second bipolar device. The first divider circuit is configured to generate a first scaled voltage using the first base-emitter voltage, and the second divider circuit is configured to generate a second scaled voltage using the second base-emitter voltage. The feedback circuit is configured to generate a reference voltage using the first scaled voltage, the second scaled voltage, and a feedback signal. The feedback circuit is also configured to generate the feedback signal using the reference voltage.

DETAILED DESCRIPTION OF EMBODIMENTS

Figure 1:
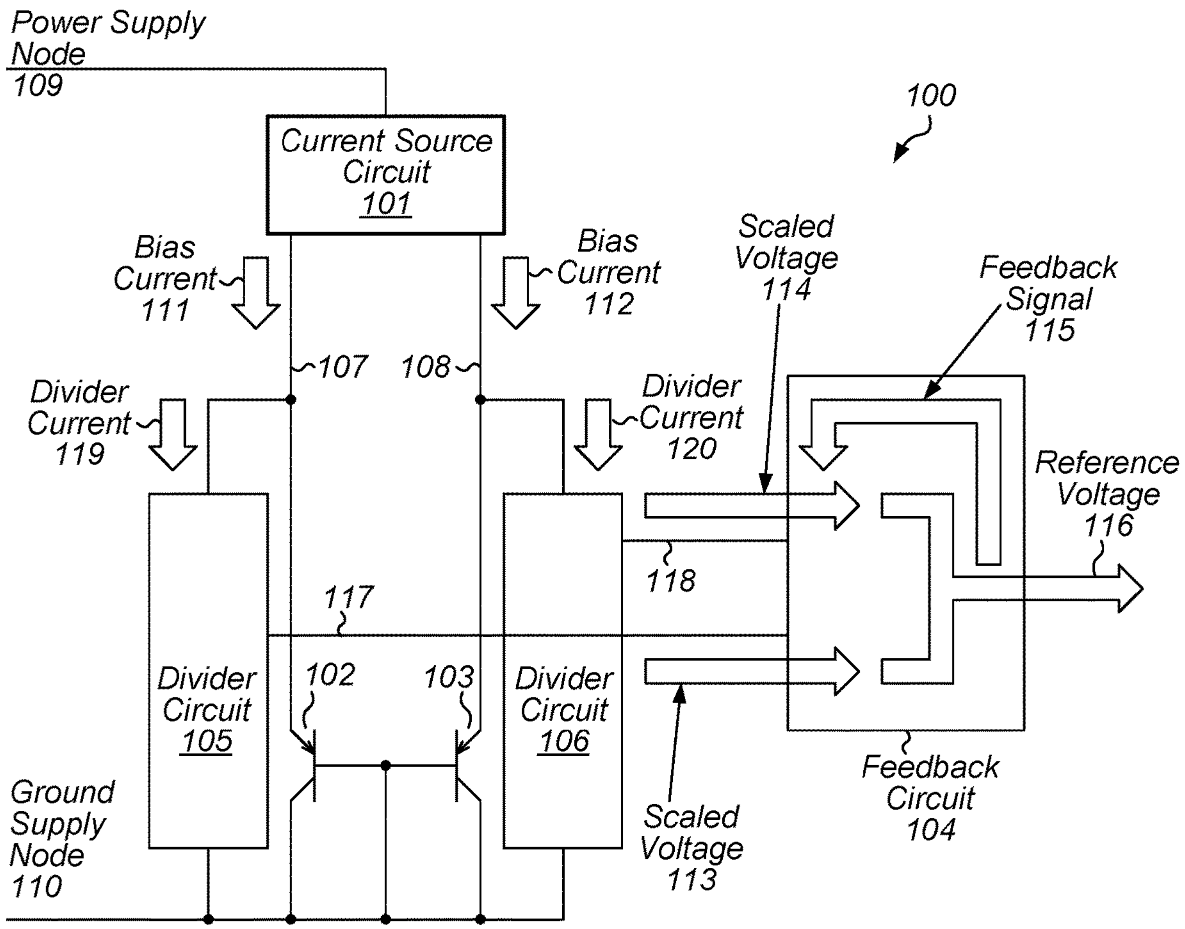
FIG. 1 is a block diagram of an embodiment of a voltage reference circuit for a computer system.

Computer systems may include multiple circuit blocks configured to perform specific functions. Such circuit blocks may include analog, mixed-signal, and radio-frequency (RF) circuits. Such circuits may include power detection circuits, performance monitoring circuits, temperature sensor circuits, power converter circuits, voltage regulator circuits, and the like.

Many analog, mixed-signal, sensor, and RF circuits rely upon precision voltage reference circuits that generate reference voltages that vary little with respect to operational parameters (e.g., supply voltage level, temperature, etc.) of the reference circuit. Such precision circuits often rely on bandgap circuits, which create a voltage level that is based on the band gap of silicon, providing the needed precision and stability.

In response to scaling of semiconductor manufacturing technology, power supply voltage levels have dropped, reducing the available voltage range needed to maintain devices in voltage reference circuits operating in saturation (referred to as "head room"). To maintain operation at power supply voltage levels below the native bandgap reference voltage (approximately 1.25V), many voltage reference circuits rely on a current-mode circuit topology that generates a reference voltage based on a difference between a PTAT current and a CTAT current. By combining a PTAT current with a CTAT current on a circuit node, the differing relationships to temperature cancel each other out, resulting in a voltage on a circuit node whose variation is minor with respect to temperature.

Such current-mode voltage reference circuits use an open-loop architecture, i.e., the operation of the a voltage reference circuit is not compensating for changes in the output of the voltage reference circuit. Without such adjustments, the open-loop voltage reference circuits are highly sensitive to power supply noise, device noise, leakage currents at the output, and circuit element mismatch, making high precision and high performance difficult to achieve.

To address the issues with the conventional current-mode voltage reference circuit architecture, a closed-loop circuit topology can be employed that uses the generated reference voltage to adjust the operation of the voltage reference circuit. In particular, the generated reference voltage is used to generate a PTAT signal which is combined with a CTAT signal generated based on the silicon bandgap. By combining the PTAT and CTAT signals, the temperature dependence of the reference voltage can be reduced. Moreover, since the PTAT signal is generated using the reference voltage, any changes (e.g., change in output load) are fed back into the voltage reference circuit in order to maintain the desired level of the reference voltage. The embodiments illustrated in the drawings and described below provide techniques for generating a reference voltage that allows operation below the native bandgap reference voltage by using a feedback loop to combine a CTAT signal and a PTAT signal to generate a reference voltage.

A block diagram of an embodiment of a voltage reference circuit is depicted in FIG. 1. As illustrated, voltage reference circuit 100 includes current source circuit 101, device 102, device 103, feedback circuit 104, divider circuit 105, and divider circuit 106.

Current source circuit 101 is configured to generate bias current 111 and bias current 112. As described below, current source circuit 101 may include multiple devices configured to generate bias current 111 and bias current 112 using a control signal whose value is based on reference voltage 116.

In various embodiments, current source circuit 101 may be configured to generate bias current 111 and bias current 112 such that the value of bias current 111 is equal to the value of bias current 112 within the operational tolerance of the circuit, process variation, and the like. Alternatively, current source circuit 101 may be configured to generate bias current 111 and bias current 112 such that the values of the two currents are different to achieve different current densities in device 102 and device 103.

Device 102 is coupled between node 107 and ground supply node 110, while device 103 is coupled between node 108 and ground supply node 110. Device 102 is configured to generate, on node 107, a first base-emitter voltage using bias current 111. In a similar fashion, device 103 is configured to generate, on node 108, a second base-emitter voltage using bias current 112.

In various embodiments, the current density of device 102 is different than the current density of device 103. As used and described herein, the current density of devices 102 and 103 refers to an amount of charge that flows through the respective emitters of devices 102 and 103 per unit time. It is noted that different techniques may be employed to generate different current densities in devices 102 and 103. In some case, device 102 and device 103 may have different emitter areas and bias currents 111 and 112 may be the same. Alternatively, bias currents 111 and 112 may be different and the emitter areas of devices 102 and 103 may be the same. In some embodiments, a combination of different bias currents and different emitter areas may be employed.

Device 102 and device 103 may, in various embodiments, be implemented as PNP bipolar transistors. In some cases, devices 102 and 103 may be implemented as parasitic vertical bipolar devices fabricated using a complementary metal-oxide semiconductor (CMOS) process.

Divider circuit 105 is configured to generate scaled voltage 113 on node 117 using the base-emitter voltage of device 102. In a similar fashion, divider circuit 106 is configured to generate scaled voltage 114 on node 118 using the base-emitter voltage of device 103. In various embodiments, scaled voltage 113 may be less than the base-emitter voltage of device 102, and scaled voltage 114 may be less than the base-emitter voltage of device 103. As described below, respective scaling factors used by divider circuit 105 and divider circuit 106 may be different.

Feedback circuit 104 is configured to generate reference voltage 116 using scaled voltage 113, scaled voltage 114, and feedback signal 115. In various embodiments, feedback circuit 104 is also configured to generate feedback signal 115 using reference voltage 116.

The injection of feedback signal 115 onto node 118 regulates the voltage level of node 118 to a value the same as the voltage level of node 117. As described below, feedback signal 115 can be generated using resistors, which results in feedback signal 115 being a PTAT signal. As described below, the value of feedback signal 115 can be derived as a function of divider current 119 and divider current 120.

The voltage level generated on node 118, i.e., scaled voltage 114 generate by divider circuit 106, is a CTAT signal. By combining feedback signal 115 and scaled voltage 114 on node 118, the variation in temperature may be canceled, resulting in reference voltage 116 having a flat response with respect to temperature.

By using reference voltage 116 to generate feedback signal 115, voltage reference circuit 100 can compensate for changes in characteristics of load circuits configured to receive reference voltage 116, as well as improve the power supply rejection ratio (PSRR) of reference circuit 100. For example, in some cases, if additional current is drawn by a load circuit from voltage reference circuit 100, feedback signal 115 can be used to maintain the value of reference voltage 116 despite the additional load.

Figure 2:
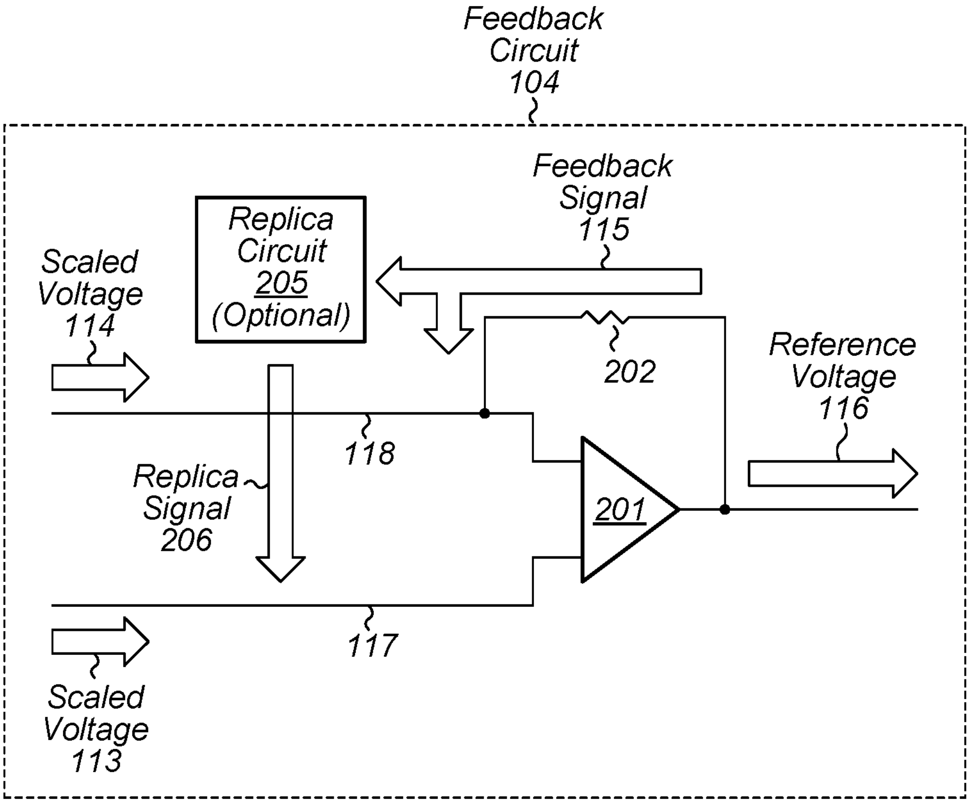
FIG. 2 is a block diagram of an embodiment of a feedback circuit for a voltage reference circuit.

Turning to FIG. 2, a block diagram of an embodiment of feedback circuit 104 is depicted. As illustrated, feedback circuit 104 includes amplifier circuit 201, resistor 202, and optional replica circuit 205.

Amplifier circuit 201 is configured to generate reference voltage 116 using the voltage level of nodes 117 and 118. In various embodiments, the voltage level of node 118 is a combination of scaled voltage 114 and feedback signal 115. In embodiments where replica circuit 205 is employed, the voltage level of node 117 is a combination of scaled voltage 113 and replica signal 206.

In some embodiments, to generate reference voltage 116, amplifier circuit 201 may be configured to amplify a difference between the respective voltage levels of nodes 117 and 118. Amplifier circuit 201 may, in various embodiments, be implemented as a differential amplifier circuit or any other amplifier circuit configured to generate an output signal that is proportional to a difference between at least two input signals.

Resistor 202 is coupled between an output of amplifier circuit 201 and node 118, which is, in turn, coupled to an input of amplifier circuit 201. In some embodiments, feedback signal 115 includes a current that flows through resistor 202 and whose value is based on a difference between reference voltage 116 and the voltage level of node 118.

Resistor 202 may, in various embodiments, be implemented using polysilicon, diffusion, metal, or any other suitable material available in a semiconductor manufacturing process. Although resistor 202 is depicted in FIG. 2 as being a single resistor, in other embodiments, resistor 202 may be implemented as multiple resistors connected in parallel, series, or any suitable combination thereof.

In cases where optional replica circuit 205 is not employed, feedback signal 115 is applied to only one of the two nodes coupled to the inputs of amplifier circuit 201. As such, feedback circuit 104 is said to be operating in an asymmetric fashion.

Alternatively, feedback circuit 104 may be operated in a symmetric fashion by employing optional replica circuit 205, which is configured to generate replica signal 206 using feedback signal 115. Replica signal 206 is applied to node 117 resulting in the voltage of node 117 being a combination of scaled voltage 113 and replica signal 206. In various embodiments, optional replica circuit 205 may be implemented using a current mirror or other suitable circuit configured to generate replica signal 206 such that its value is the same as feedback signal 115.

Figure 3:
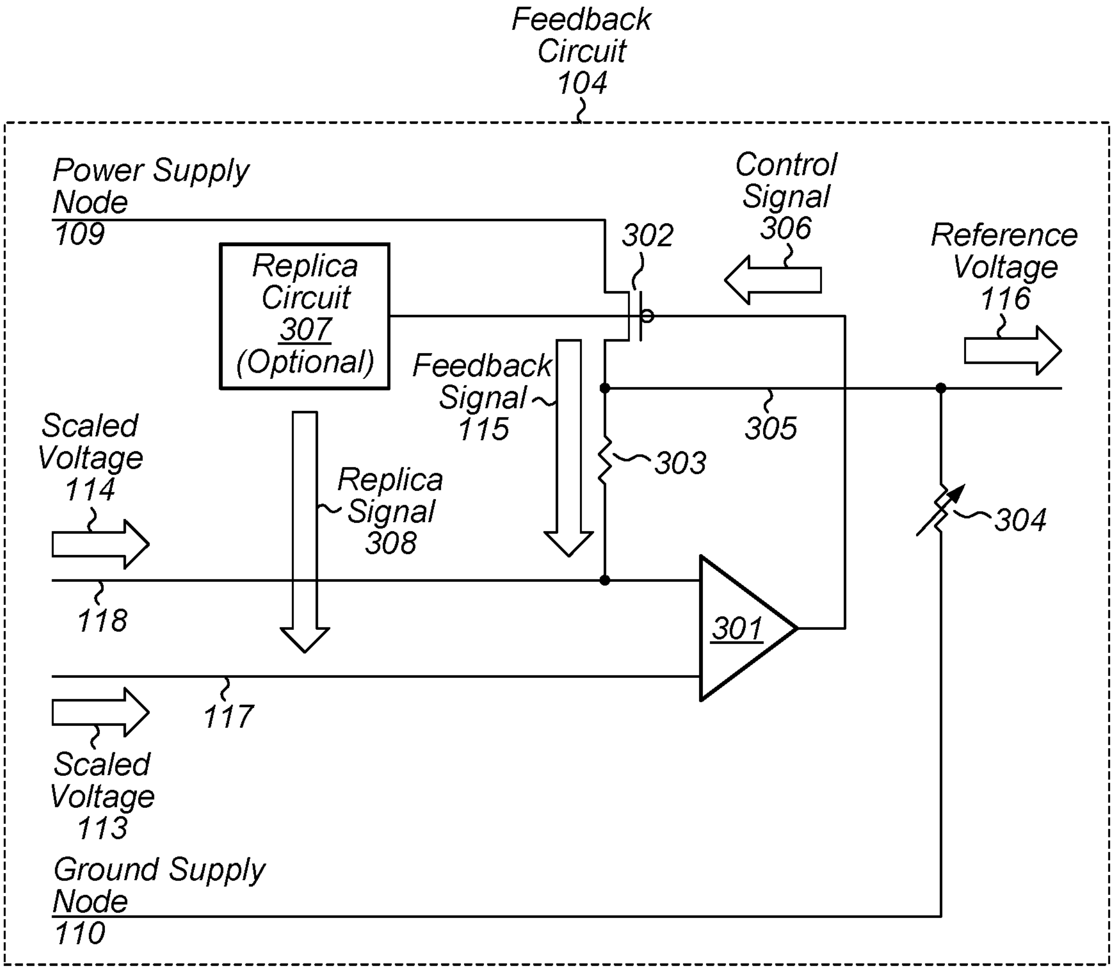
FIG. 3 is a block diagram of a different embodiment of a feedback circuit for a voltage reference circuit.

A block diagram of another embodiment of feedback circuit 104 is depicted in FIG. 3. As illustrated, feedback circuit 104 includes amplifier circuit 301, device 302, resistor 303, resistor 304, and optional replica circuit 307.

Device 302 is coupled between power supply node 109 and node 305, and is controlled by control signal 306. In various embodiments, device 302 is configured to generate, based on the voltage level of control signal 306, a current that corresponds to feedback signal 115. To generate feedback signal 115, device 302 is further configured to adjust a conductance between power supply node 109 and node 305 based on the voltage level of control signal 306.

In various embodiments, device 302 may be implemented as a p-channel metal-oxide semiconductor field-effect transistor (MOSFET), Fin field-effect transistor (FINFET), a gate-all-around field-effect transistor (GAAFET), or any other suitable transconductance device.

Resistor 304 is coupled between node 305 and ground supply node 110 and is configured to sink a current from node 305 into ground supply node 110. In various embodiments, resistor 304 may be trimmed post-manufacture to adjust the variation of reference voltage 116 with respect to temperature (referred to as "curvature") by selecting a specific asymmetry in the values of bias currents 111 and 112 as depicted in FIG. 1. Resistor 304 may, in some embodiments, determine the temperature coefficients of bias currents 111 and 112.

Resistor 303 is coupled between node 305 and node 118, which is, in turn, coupled to an input of amplifier circuit 301. As feedback signal 115 flows from device 302 into node 118, a voltage drop is developed across resistor 303 which corresponds to reference voltage 116.

Amplifier circuit 301 is configured to generate control signal 306 using the voltage level of nodes 117 and 118. In various embodiments, the voltage level of node 118 is a combination of scaled voltage 114 and feedback signal 115. In embodiments where replica circuit 307 is employed, the voltage level of node 117 is a combination of scaled voltage 113 and replica signal 308.

In some embodiments, to generate control signal 306, amplifier circuit 301 may be configured to amplify a difference between the respective voltage levels of nodes 117 and 118. Amplifier circuit 301 may, in various embodiments, be implemented as a differential amplifier circuit or any other amplifier circuit configured to generate an output signal that is proportional to a difference between at least two input signals.

Resistors 303 and 304 may be implemented using polysilicon, metal, or any other suitable material available on a semiconductor manufacturing process. Although depicted as single resistors in the embodiment of FIG. 3, in other embodiments, resistors 303 and 304 may be implemented using any suitable series or parallel combination of resistors.

Figure 4:
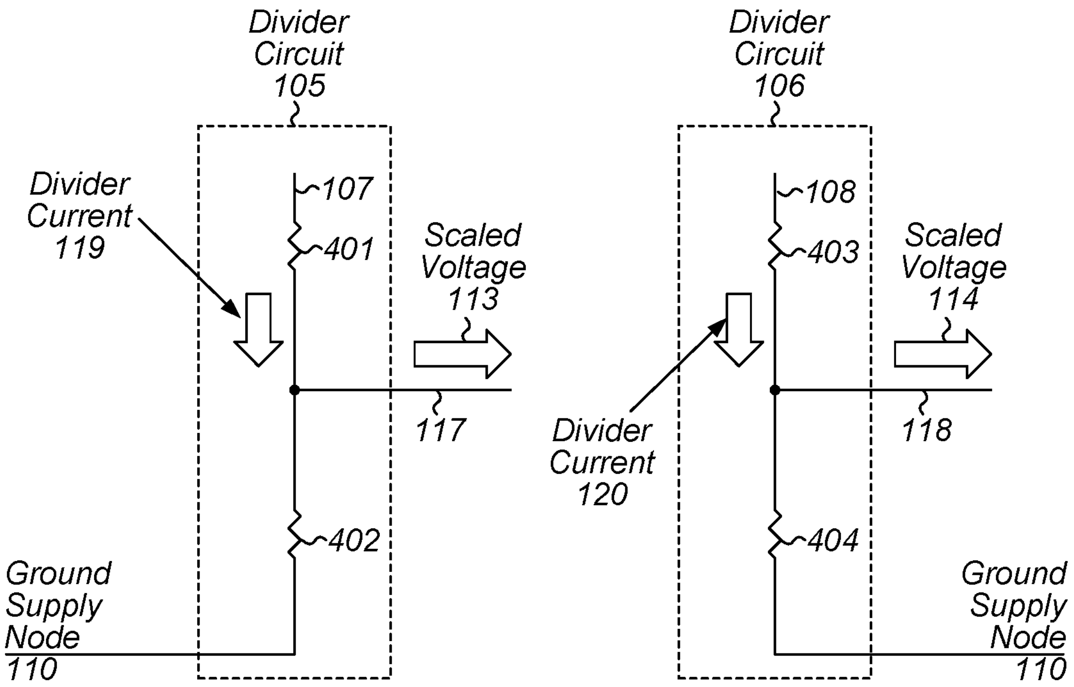
FIG. 4 is a block diagram of divider circuits for a voltage reference circuit.

Turning to FIG. 4, block diagrams of divider circuit 105 and divider circuit 106 are depicted. As illustrated, divider circuit 105 includes resistors 401 and 402, while divider circuit 106 includes resistors 403 and 404.

Resistor 401 is coupled between nodes 107 and 117, and resistor 402 is coupled between node 117 and ground supply node 110. In a similar fashion, resistor 403 is coupled between nodes 108 and 118, and resistor 404 is coupled between node 118 and ground supply node 110.

Resistors 401 and 402 form a resistive voltage divider circuit that generates scaled voltage 113 on node 117. In a similar fashion, resistors 403 and 404 also form a resistive voltage divider circuit that generates scaled voltage 114 on node 118. The voltage level of scaled voltage 113 is based on the voltage level of node 107 as well as the values of resistors 401 and 402 as depicted in Equation 1, where $V_{113}$ is the voltage level of scaled voltage 113, $V_{107}$ is the voltage level of node 107, $R_{401}$ is the value of resistor 401, and $R_{402}$ is the value of resistor 402. Similarly, the voltage level of scaled voltage 114 is based on the voltage level of node 108 as well as the values of resistors 403 and 404 as depicted in Equation 2, where $V_{114}$ is the voltage level of scaled voltage 114, $V_{108}$ is the voltage level of node 108, $R_{403}$ is the value of resistor 403, and $R_{404}$ is the value of resistor 404.

$$V_{113} = \frac{R_{402}}{R_{401} + R_{402}} V_{107} \tag{1}$$

$$V_{114} = \frac{R_{404}}{R_{403} + R_{404}} V_{108} \tag{2}$$

In various embodiments, the values of resistors 401-403 are used to scale the base-to-emitter voltages of devices 102 and 103 to set the absolute value of reference voltage 116. The respective values of resistors 401 and 403 may be the same and the respective values of resistors 402 and 404 may be the same to generate the same scaling factor for divider circuit 105 and divider circuit 106. In other embodiments, however, the values of the resistors in divider circuit 105 may be different than the values of the resistors in divider circuit 106 to intentionally introduce different scale values.

In cases where the respective values of resistors 401 and 403 are the same and the respective values of resistors 402 and 404 are the same, the value of feedback signal can be derived as shown in Equation 3, where $I_{fb}$ is the value of feedback signal 115, $I_{div1}$ is the value of divider current 119, $I_{div2}$ is the value of divider current 120, $R_1$ is the value of either resistors 401 or 403, η is the bipolar transistor ideality factor, $V_t$ is the thermal voltage, and N is the scale factor between the current densities of devices 102 and 103.

$$I_{fb} = I_{div1} - I_{div2} = \frac{\Delta V_{be}}{R_1} = \frac{\eta V_t}{R_1}\ln(N) \tag{3}$$

In embodiments where divider circuits 105 and 106 are implemented as depicted in FIG. 4, the value of reference voltage 116 can be evaluated using Equation 4, where $V_{ref}$ is the value of reference voltage 116, $V_{be1}$ is the base-to-emitter voltage of device 102, $R_1$ is the value of resistor 401, $R_2$ is the value of resistor 402, $R_3$ is the value of resistor 403, $\Delta V_{be}$ and is the difference in the base-to-emitter voltages of device 102 and device 103.

$$V_{ref} = V_{be1} \cdot \frac{R_2}{R_1 + R_2} + \Delta V_{be} \frac{R_3}{R_1} \tag{4}$$

Although depicted as individual resistors in the embodiment of FIG. 4, in other embodiments resistors 401-404 may be implemented using any suitable series or parallel combination of resistors. In various embodiments, resistors 401-404 may be implemented using polysilicon, metal, or any other suitable material available in a semiconductor manufacturing process. It is noted that, in other embodiments, divider circuits 105 and 106 may be implemented using capacitors or active devices (e.g., MOSFETs) in lieu of, or in combination with, resistors 401-404.

Figure 5:
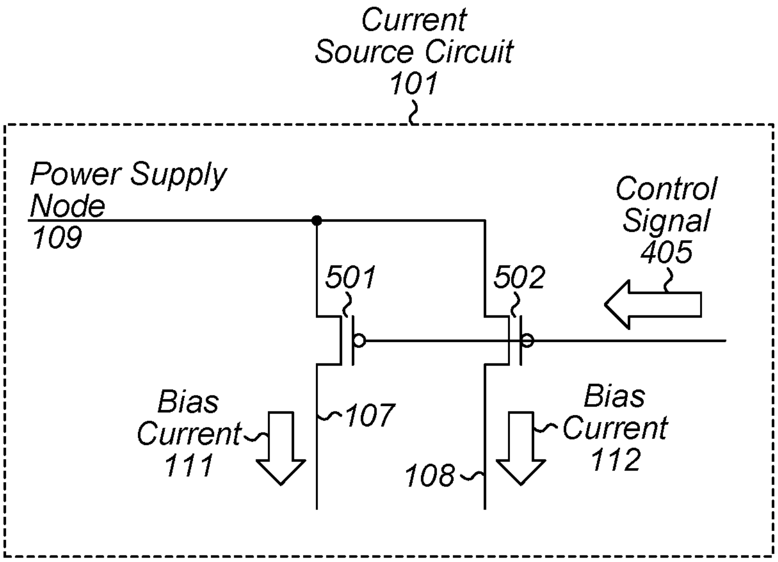
FIG. 5 is a block diagram of a current source circuit for a voltage reference circuit.

Turning to FIG. 5, a block diagram of an embodiment of current source circuit 101 is depicted. As illustrated, current source circuit 101 includes devices 501 and 502. Device 501 is coupled between power supply node 109 and node 107, and device 502 is coupled between power supply node 109 and node 108.

Device 501 is configured to generate bias current 111 based on a voltage level of control signal 405. In a similar fashion, device 502 is configured to generate bias current 112 using the voltage level of control signal 405. To generate bias current 111, device 501 is further configured to adjust a conductance between power supply node 109 and node 107 based on the voltage level of control signal 405, and device 502 is further configured to adjust a conductance between power supply node 109 and node 108 based on the voltage level of control signal 405. For example, in response to a decrease in the voltage level of control signal 405, device 501 increases a conductance between power supply node 109 and node 107, thereby increasing the value of bias current 112.

In various embodiments, physical or electrical properties (e.g., transistor width) of devices 501 and 502 may be adjusted to maintain a desired asymmetry in the bias of devices 102 and 103. In some cases, a constant factor N between the current densities of devices 102 and 103 may be maintained if the difference between bias current 111 and bias current 112 is equal to a value of a current flowing in device 302 as depicted in FIG. 3. It is noted that using asymmetric values for bias currents 111 and 112, can improve startup behavior of the feedback loop included in voltage reference circuit 100.

Devices 501 and 502 may, in various embodiments, be implemented as p-channel MOSFETs, FinFETs, GAAFETs, or any other suitable type of transconductance devices. Although both device 501 and device 502 are depicted as being single devices, in other embodiments, devices 501 and 502 may be implemented using multiple devices coupled together in parallel.

It is noted that although the embodiment of current source circuit 101 depicted in FIG. 5 uses control signal 405, which is based on reference voltage 116, to generate bias currents 111 and 112, in other embodiments, bias currents 111 and 112 may be generated without the use of control signal 405.

Figure 6:
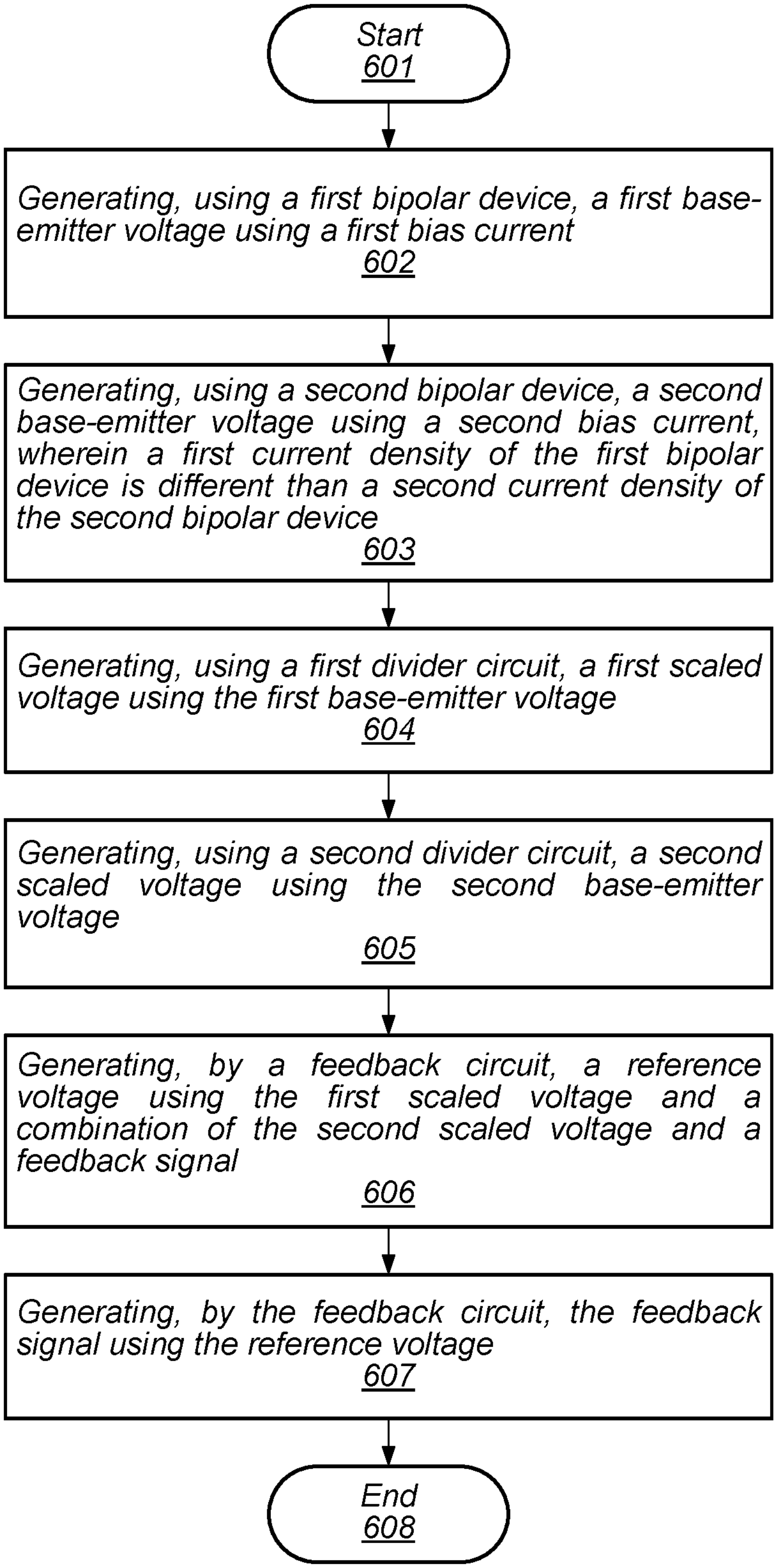
FIG. 6 is a flow diagram of an embodiment of a method for operating a voltage reference circuit.

Turning to FIG. 6, a flow diagram depicting an embodiment of a method for operating a voltage reference circuit is illustrated. The method, which begins at block 601, may be applied to various voltage reference circuits including voltage reference circuit 100 as depicted in FIG. 1.

The method includes generating, using a first bipolar device, a first base-emitter voltage using a first bias current (block 602).

The method also includes generating, using a second bipolar device, a second base-emitter voltage using a second bias current (block 603). In various embodiments, a first current density of the first bipolar device is different than a second current density of the second bipolar device. As described above, the different current densities may be achieved using a variety of techniques. For example, in some embodiments, the respective emitter areas of the first bipolar device and the second bipolar device may be different. Alternatively, in other embodiments, the respective values of the first bias current and the second bias current may be different. It is noted that, in some embodiments, a combination of techniques may be employed to achieve different current densities in the first bipolar device and the second bipolar device. For example, in some cases, different bias current values and different emitter areas may both be employed.

The method further includes generating, using a first divider circuit, a first scaled voltage using the first base-emitter voltage (block 604). In various embodiments, the first divider circuit may include a resistive voltage divider circuit. It is noted that, in other embodiments, any suitable divider circuit, e.g., a capacitive voltage divider circuit, may be employed to implement the first divider circuit.

The method also includes generating, using a second divider circuit, a second scaled voltage using the second base-emitter voltage (block 605). In various embodiments, the second divider circuit may include a resistive voltage divider circuit. It is noted that, in other embodiments, any suitable divider circuit, e.g., a capacitive voltage divider circuit, may be employed to implement the second divider circuit.

The method further includes generating, by a feedback circuit, a reference voltage using the first scaled voltage and a combination of the second scaled voltage and a feedback signal (block 606). In various embodiments, generating the reference voltage includes combining the feedback signal and the second scaled voltage, and generating the reference voltage based on a difference between the first scaled voltage and a combination of the feedback signal and the second scaled voltage.

In some embodiments, the feedback circuit may operate in a symmetric fashion. When operating in such a fashion, the method may further include generating a replica of the feedback signal, and combining the replica of the feedback signal with the first scaled voltage. The method may additionally include generating the reference voltage based on a difference between a combination of the replica of the feedback signal and the first scaled voltage, and the combination of the feedback signal and the second scaled voltage.

The method also includes generating, by the feedback circuit, the feedback signal using the reference voltage (block 607). In some cases, the feedback signal includes a feedback current, and the method also includes generating a control signal using the first scaled voltage, the second scaled voltage, and the feedback signal. The method may further include generating, by a device coupled to an input power supply node and using the control signal, the feedback current. In various embodiments, the device is also coupled to an output of the second divider circuit via a resistor. The method may, in some embodiments, include generating, by the resistor using the feedback current, the reference voltage.

The control signal may, in various implementations, be used for other purposes. For example, in some embodiments, the method may include generating, by a first device coupled to the input power supply node, the first bias current using the control signal, and generating, by a second device coupled to the input power supply node, the second bias current using the control signal. It is noted that, in various embodiments, a size of the first device may be different than a size of the second device to generate different values for the first bias current and the second bias current. The method concludes in block 608.

Figure 7:
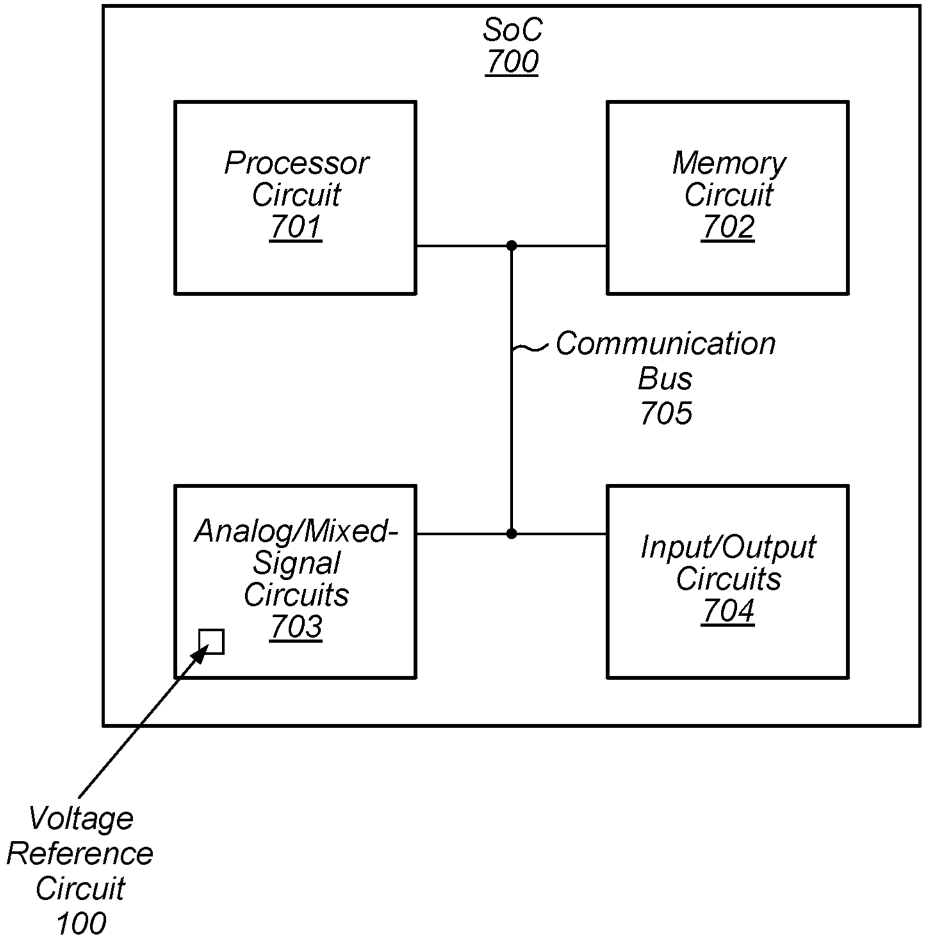
FIG. 7 is a block diagram of one embodiment of a system-on-a-chip that includes a voltage reference circuit.

A block diagram of a system-on-a-chip (SoC) is illustrated in FIG. 7. In the illustrated embodiment, SoC 700 includes processor circuit 701, memory circuit 702, analog/mixed-signal circuits 703, and input/output circuits 704 each of which is coupled to communication bus 705. In various embodiments, SoC 700 may be configured for use in a desktop computer, server, or in a mobile computing application such as, e.g., a tablet, laptop computer, or wearable computing device.

Processor circuit 701 may, in various embodiments, be representative of a general-purpose processor that performs computational operations. For example, processor circuit 701 may be a central processing unit (CPU) such as a microprocessor, a microcontroller, an application-specific integrated circuit (ASIC), or a field-programmable gate array (FPGA).

Memory circuit 702 may, in various embodiments, include any suitable type of memory such as a Dynamic Random-Access Memory (DRAM), a Static Random-Access Memory (SRAM), a Read-Only Memory (ROM), an Electrically Erasable Programmable Read-only Memory (EEPROM), or a non-volatile memory, for example. It is noted that although a single memory circuit is illustrated in FIG. 7, in other embodiments, any suitable number of memory circuits may be employed.

Analog/mixed-signal circuits 703 may include a crystal oscillator circuit, a phase-locked loop (PLL) circuit, an analog-to-digital converter (ADC) circuit, and a digital-to-analog converter (DAC) circuit (all not shown). In other embodiments, analog/mixed-signal circuits 703 may be configured to perform power management tasks with the inclusion of on-chip power supplies and voltage regulators. In some embodiments, analog/mixed-signal circuits 703 may include voltage reference circuit 100 as depicted in FIG. 1.

Input/output circuits 704 may be configured to coordinate data transfer between SoC 700 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 704 may be configured to implement a version of Universal Serial Bus (USB) protocol or IEEE 1394 (Firewire®) protocol.

Input/output circuits 704 may also be configured to coordinate data transfer between SoC 700 and one or more devices (e.g., other computing systems or integrated circuits) coupled to SoC 700 via a network. In one embodiment, input/output circuits 704 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 704 may be configured to implement multiple discrete network interface ports.

Figure 8:
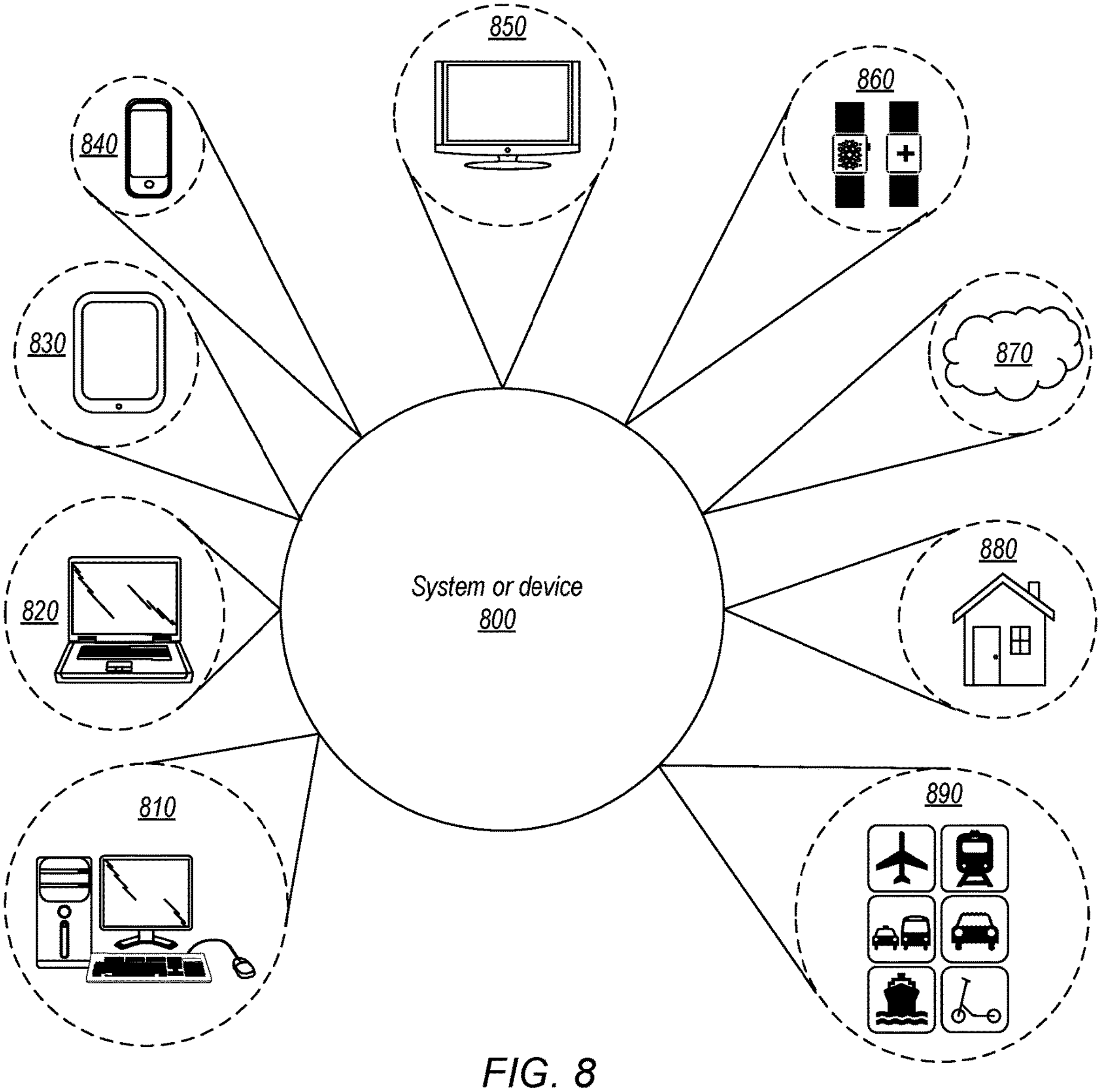
FIG. 8 is a block diagram of various embodiments of computer systems that may include power converter circuits.

Turning now to FIG. 8, various types of systems that may include any of the circuits, devices, or systems discussed above are illustrated. System or device 800, which may incorporate or otherwise utilize one or more of the techniques described herein, may be utilized in a wide range of areas. For example, system or device 800 may be utilized as part of the hardware of systems such as a desktop computer 810, laptop computer 820, tablet computer 830, cellular or mobile phone 840, or television 850 (or set-top box coupled to a television).

Similarly, disclosed elements may be utilized in a wearable device 860, such as a smartwatch or a health-monitoring device. Smartwatches, in many embodiments, may implement a variety of different functions for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 800 may also be used in various other contexts. For example, system or device 800 may be utilized in the context of a server computer system, such as a dedicated server or on shared hardware that implements a cloud-based service 870. Still further, system or device 800 may be implemented in a wide range of specialized everyday devices, including devices 880 commonly found in the home such as refrigerators, thermostats, security cameras, etc. The interconnection of such devices is often referred to as the "Internet of Things" (IoT). Elements may also be implemented in various modes of transportation. For example, system or device 800 could be employed in the control systems, guidance systems, entertainment systems, etc. of various types of vehicles 890.

The applications illustrated in FIG. 8 are merely exemplary and are not intended to limit the potential future applications of disclosed systems or devices. Other example applications include, without limitation: portable gaming devices, music players, data storage devices, unmanned aerial vehicles, etc.

Figure 9:
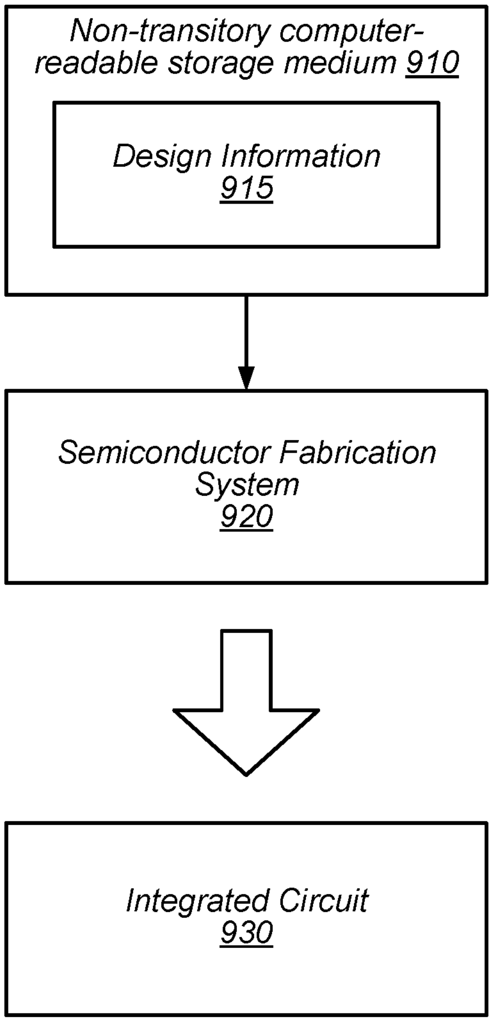
FIG. 9 illustrates an example of a non-transitory computer-readable storage medium that stores circuit design information.

FIG. 9 is a block diagram illustrating an example of a non-transitory computer-readable storage medium that stores circuit design information, according to some embodiments. In the illustrated embodiment, semiconductor fabrication system 920 is configured to process design information 915 stored on non-transitory computer-readable storage medium 910 and fabricate integrated circuit 930 based on design information 915.

Non-transitory computer-readable storage medium 910 may comprise any of various appropriate types of memory devices or storage devices. Non-transitory computer-readable storage medium 910 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash or magnetic media (e.g., a hard drive), or optical storage; registers, or other similar types of memory elements, etc. Non-transitory computer-readable storage medium 910 may include other types of non-transitory memory as well as combinations thereof. Non-transitory computer-readable storage medium 910 may include two or more memory mediums, which may reside in different locations, e.g., in different computer systems that are connected over a network.

Design information 915 may be specified using any of various appropriate computer languages, including hardware description languages such as, without limitation: VHDL, Verilog, SystemC, SystemVerilog, RHDL, M, MyHDL, etc. Design information 915 may be usable by semiconductor fabrication system 920 to fabricate at least a portion of integrated circuit 930. The format of design information 915 may be recognized by at least one semiconductor fabrication system, such as semiconductor fabrication system 920, for example. In some embodiments, design information 915 may include a netlist that specifies elements of a cell library, as well as their connectivity. One or more cell libraries used during logic synthesis of circuits included in integrated circuit 930 may also be included in design information 915. Such cell libraries may include information indicative of device or transistor level netlists, mask design data, characterization data, and the like, of cells included in the cell library.

Integrated circuit 930 may, in various embodiments, include one or more custom macrocells, such as memories, analog or mixed-signal circuits, and the like. In such cases, design information 915 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 is configured to operate according to a circuit design specified by design information 915, which may include performing any of the functionality described herein. For example, integrated circuit 930 may include any of various elements shown or described herein. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. An apparatus, comprising:

a current source configured to generate a first bias current and a second bias current;

a first bipolar device configured to generate a first base-emitter voltage using the first bias current;

a second bipolar device configured to generate a second base-emitter voltage using the second bias current, wherein a first current density of the first bipolar device is different than a second current density of the second bipolar device;

a first divider circuit configured to generate a first scaled voltage using the first base-emitter voltage on a first divider node;

a second divider circuit configured to generate a second scaled voltage using the second base-emitter voltage on a second divider node; and an amplifier circuit coupled to receive the first scaled voltage on a first input and the second scaled voltage on a second input, wherein the amplifier circuit is configured to cause, based on the first scaled voltage and the second scaled voltage, a reference voltage to be generated on a reference node;

wherein the first scaled voltage is modified by a feedback signal provided to the first input via a first resistor coupled between the reference node and the first input, wherein the second scaled voltage is modified by a replica circuit coupled to receive the feedback signal and configured to generate a replica of the feedback signal, and wherein the replica circuit is coupled between the first resistor and the second input.

2. The apparatus of claim 1, wherein a first emitter area of the first bipolar device is different than a second emitter area of the second bipolar device.

3. The apparatus of claim 1, wherein a first value of the first bias current is different from a second value of the second bias current.

4. The apparatus of claim 1, wherein the first divider circuit is configured to generate the first scaled voltage using a first scaling factor, and wherein the second divider circuit is configured to generate the second scaled voltage using a second scaling factor different than the first scaling factor.

5. The apparatus of claim 1, wherein the amplifier circuit is configured to cause generation of the sin.gle feedback signal by applying the reference voltage to the first resistor, and wherein the reference node is coupled directly to an output of the amplifier circuit.

6. The apparatus of claim 1, further comprising:

a first transistor coupled between an input power supply node and the reference node, wherein the first transistor is configured to source, based on a control signal that is output by the amplifier circuit, a first current to the reference node, wherein the first resistor is coupled between the reference node and the first input of the amplifier circuit, and further coupled to the first transistor, wherein the first resistor is configured to generate the feedback signal; and a second resistor coupled between the reference node and a ground supply node, and configured to sink a second current from the reference node to adjust a reference voltage on the reference node.

7. The apparatus of claim 6, wherein the amplifier circuit is configured to generate the control signal based on the first scaled voltage, as modified by the feedback signal, and the second scaled voltage.

8. A method, comprising:

generating, using a first bipolar device, a first base-emitter voltage using a first bias current;

generating, using a second bipolar device, a second base-emitter voltage using a second bias current, wherein a first current density of the first bipolar device is different than a second current density of the second bipolar device;

generating, using a first divider circuit, a first scaled voltage on a first divider node using the first base-emitter voltage;

generating, using a second divider circuit, a second scaled voltage on a second divider node using the second base-emitter voltage;

receiving, on a first input of an amplifier circuit, the first scaled voltage;

receiving, on a second input of the amplifier circuit, the second scaled voltage;

generating, by the amplifier circuit and based on the first and second scaled voltages, a reference voltage on a reference node;

generating, based on the reference voltage, a feedback signal;

providing the feedback signal, via a first resistor, to the first input of the amplifier circuit to modify the first scaled voltage; and generating, using a replica circuit coupled between the first resistor and the second input of the amplifier circuit, a replica of the feedback signal; and modifying the second scaled voltage using the replica of the feedback signal.

9. The method of claim 8, wherein a first emitter area of the first bipolar device is different than a second emitter area of the second bipolar device.

10. The method of claim 8, wherein a first value of the first bias current is different from a second value of the second bias current.

11. The method of claim 8, wherein generating the first scaled voltage includes generating the first scaled voltage by the first divider circuit using a first scaling factor, and wherein generating the second scaled voltage includes generating the second scaled voltage by the second divider circuit using a second scaling factor different than the first scaling factor.

12. The method of claim 8, wherein generating the feedback signal comprises applying from an output of the amplifier circuit, the reference voltage to the first resistor.

13. The method of claim 8, further comprising:

sourcing, by a first transistor and based on a control signal that is output by the amplifier circuit, a first current to the reference node, wherein the first resistor is coupled between the reference node and the first input of the amplifier circuit, and further coupled to the first transistor;

generating, using the first transistor, the feedback signal based on the first current; and sinking a second current from the reference node to a ground supply node via a second resistor coupled between the reference node and the ground supply node.

14. The method of claim 13, further comprising generating the control signal, using the amplifier circuit, based on the first scaled voltage, as modified by the feedback signal, and the second scaled voltage.

15. An apparatus, comprising:

a functional circuit block coupled to a reference node; and a voltage reference circuit that includes a first bipolar device, a second bipolar device, and an amplifier circuit, wherein the voltage reference circuit is configured to:

generate a first base-emitter voltage using the first bipolar device and a first bias current;

generate a second base-emitter voltage using the second bipolar device and a second bias current, wherein a first current density of the first bipolar device is different than a second current density of the second bipolar device;

generate a first scaled voltage on a first divider node using the first base-emitter voltage;

generate a second scaled voltage on a second divider node using the second base- emitter voltage;

receive, on a first input of an amplifier circuit, the first scaled voltage;

receive, on a second input of the amplifier circuit, the second scaled voltage;

generate, as caused by the amplifier circuit and based on the first and second scaled voltages, a reference voltage on the reference node;

generate, based on the reference voltage, a feedback signal; and provide the feedback signal, via a first resistor, to the first input of the amplifier circuit to modify the first scaled voltage;

wherein the voltage reference circuit includes a replica circuit coupled between the first resistor and the second input of the amplifier circuit, wherein the replica circuit is configured to generate a replica of the feedback signal and further configured to modify the second scaled voltage using the replica of the feedback signal.

16. The apparatus of claim 15, wherein a first emitter area of the first bipolar device is different than a second emitter area of the second bipolar device.

17. The apparatus of claim 15, wherein a first value of the first bias current is different from a second value of the second bias current.

18. The apparatus of claim 15, wherein to generate the first scaled voltage the voltage reference circuit is further configured to generate the first scaled voltage using a first scaling factor, and wherein to generate the second scaled voltage, the voltage reference circuit is further configured to generate the second scaled voltage using a second scaling factor different than the first scaling factor.

19. The apparatus of claim 15, further comprising wherein the amplifier circuit is configured to cause generation of the feedback signal by applying the reference voltage to the first resistor, and wherein the reference node is coupled directly to an output of the amplifier circuit.

20. The apparatus of claim 15, further comprising:

a first transistor coupled between an input power supply node and the reference node, wherein the first transistor is configured to source, based on a control signal that is output by the amplifier circuit, a first current to the reference node, wherein the first resistor is coupled between the reference node and the first input of the amplifier circuit, and further coupled to the first transistor, wherein the first resistor is configured to generate the feedback signal; and a second resistor coupled between the reference node and a ground supply node, and configured to sink a second current from the reference node to adjust the reference voltage on the reference node.

* * * * *